United States Patent [19]

Ishikawa et al.

[11] 4,326,696
[45] Apr. 27, 1982

[54] SOLENOID VALVE

[75] Inventors: Eizi Ishikawa, Nagoya; Ryouichi Matsuura, Anjo; Kiyotosi Yano, Chiryu, all of Japan

[73] Assignee: Nippondenso Co., Ltd., Kariya, Japan

[21] Appl. No.: 46,756

[22] Filed: Jun. 8, 1979

[30] Foreign Application Priority Data

Jun. 14, 1978 [JP] Japan .................. 53-81274[U]

[51] Int. Cl.³ .................. F16K 31/06; H01F 7/08
[52] U.S. Cl. .................. 251/129; 137/625.65; 251/141; 335/255; 335/260
[58] Field of Search .................. 251/129, 141; 137/625.65; 335/250, 255, 260

[56] References Cited

U.S. PATENT DOCUMENTS

| | | | |
|---|---|---|---|
| 3,598,360 | 8/1971 | Merriner | 251/129 |
| 3,757,263 | 9/1973 | Saarem et al. | 251/129 X |
| 3,837,618 | 9/1974 | Juhel | 335/255 X |
| 3,856,260 | 12/1974 | Giordano | 251/129 |
| 4,067,541 | 1/1978 | Hunter | 251/129 |

FOREIGN PATENT DOCUMENTS 1108572  4/1968  United Kingdom .................. 251/129

Primary Examiner—Arnold Rosenthal
Attorney, Agent, or Firm—Cushman, Darby & Cushman

[57] ABSTRACT

A solenoid valve for opening and closing a fluid passage formed therein by the movement of a movable core in which a coil is wound around a resin bobbin and a stator core is fixed at one end portion of a center hole of the bobbin. A magnetic path plate having a ring-shaped portion and a flanged portion is insert-moulded in a body of the bobbin with a part of the flanged portion protruding radially to the outside of the body of the bobbin. The magnetic path plate is disposed such that the inner surface of the ring-shaped portion surrounds the outer surface of the moving core and the ring-shaped portion is concentric with the center hole of the bobbin. Since the protruding flanged portion is connected mechanically to one end of a yoke, a magnetic path is provided between the movable core and the yoke through the magnetic path plate with a reduced reluctance.

14 Claims, 10 Drawing Figures

SOLENOID VALVE

BACKGROUND OF THE INVENTION

This invention relates to a solenoid operated valve useful for opening and closing fluid passages, and more particularly, to a solenoid valve suitable for opening and closing a path for intake vacuum.

SUMMARY OF THE INVENTION

The purpose of this invention is to provide a solenoid valve which has a reduced reluctance (magnetic resistance) and which is of small size and light weight. In this invention, a bobbin around which a coil is wound is made of resin, and a magnetic path plate is insert-molded within a body of the bobbin integrally such that the magnetic path plate is opposed to the periphery of a movable core.

DESCRIPTION OF THE PREFERRED EMBODIMENTS

Figure 1:
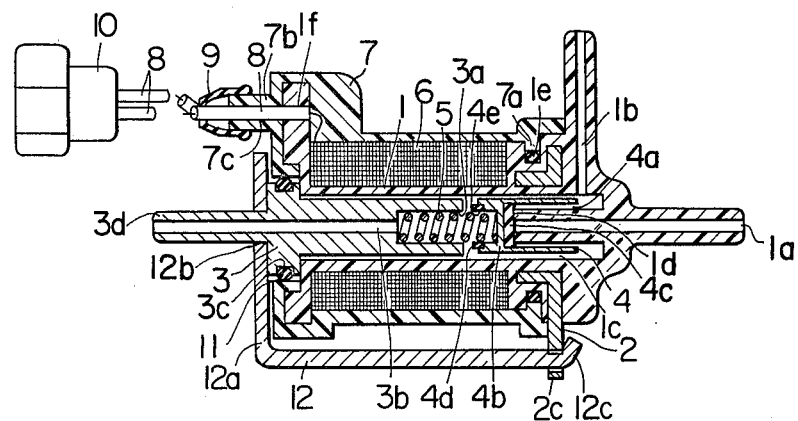
FIG. 1 is a longitudinal sectional view of a solenoid valve of a first embodiment according to this invention.
Figure 2:
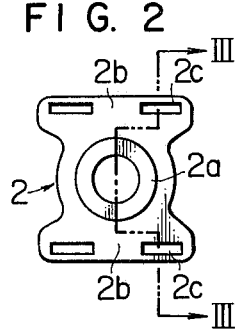
FIG. 2 is a front view of a magnetic path plate shown in FIG. 1.
Figure 3:
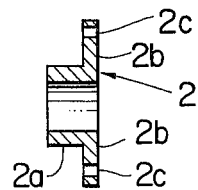
FIG. 3 is a sectional view of the magnetic plath plate of FIG. 2.
Figure 4:
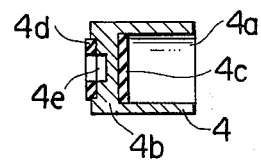
FIG. 4 is a sectional view of a movable iron core shown in FIG. 1.

FIG. 1 to FIG. 6 show a first embodiment of this invention. Numeral 1 is a bobbin made of resin, and in which an entrance path 1a through which the intake vacuum of an engine is introduced and an exit path 1b leading to a diaphragm (not shown) operated by the intake vacuum are integrally formed in the bobbin 1. Also, a ring portion 2a of a magnetic path plate 2 made by press work is insert-formed in the bobbin 1. This magnetic path plate 2 has the ring portion 2a and a connecting plate 2b projecting to the outside of the bobbin 1 from the periphery of the ring portion 2a and also has a hole 2c bored in the connecting plate 2b. 3 and 4 are a stator core and a movable core respectively which are located in a center hole 1c of the bobbin 1, and the stator core 3 has a cylindrical concave portion 3a, an opening passage to the atmosphere 3b, a ring-shaped groove 3c for an O-ring and a pipe-shaped projecting portion 3d.

Furthermore, the movable core 4 is of a cylindrical shape having a bottom wall, and has a hollow portion 4a, a bottom plate 4b, rubber valve plates 4c, 4d fixed by baking respectively to both sides of this bottom plate 4b, and also has a circular concave portion 4e. 5 is a coil spring located between the stator core 3 and the movable core 4, and it presses the movable core 4 against the valve seat 1d positioned at one end of the entrance path 1a of the bobbin 1 and keeps the movable core 4 separated from the stator core 3.

Figure 5:
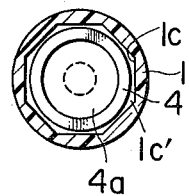
FIG. 5 is a sectional view of a sliding portion between a bobbin and a movable iron core.

Both ends of this coil spring 5 are held in the concave portions 3a and 4e respectively. The ring portion 2a of the above-mentioned magnetic path plate 2 is insert-formed in the bobbin 1 such that the ring portion 2a is concentric with the bobbin 1 and the inner surface of the ring portion 2a is opposed to the periphery of the movable core 4. Further, the centre hole 1c of the bobbin 1 is formed in a polygonal shape as shown in FIG. 5 at a portion facing the sliding portion of the movable core 4 (in this embodiment a regular octagonal shape hole is formed). 6 is a coil wound around the periphery of the bobbin 1. 7 is a resin cover formed on the outside of the bobbin 1 after winding the coil 6 so as to wrap the periphery of the coil 6. This resin cover 7 has a projecting portion 7a reaching the bottom of the ring-shaped groove 1e formed on the outside surface of the bobbin 1 so as to achieve a water-proof effect to prevent water from entering the coil portion 6 which would otherwise occur depending on a mating condition of the ring-shaped groove 1e and the projected portion 7a. Furthermore, both ends of the coil 6 are connected by soldering with lead-lines 8 which are drawn outside through through-holes 1f of the bobbin 1 and through-holes 7c of the projected portion 7b of the resin cover 7. 9 is a rubber cap preventing water from entering the coil portion 6 through the draw-out portion of the lead-lines 8, and it is fitted over the projected portion 7b. 10 is a connector connected with the ends of the lead-lines 8 and also connected with a solenoid valve control circuit (not shown).

The material of the above-mentioned bobbin 1 and the resin cover 7 is preferably required to exhibit a superior heat-resistant property, and for example, polybutylene, terephthalate, nylon, polyacetal, etc. are suitable.

Figure 6:
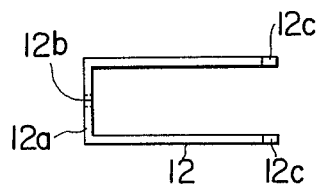
FIG. 6 a schematic front view of a yoke shown in FIG. 1.

The above-mentioned stator core 3, movable core 4 and spring 5 are assembled within the center hole 1c of the bobbin 1 after the bobbin 1, coil 6 and resin cover 7 are formed integrally as a unit, and an O-ring 11 fitted in the ring-shaped groove 3c of the stator core 3 is interposed between the stator core 3 and the resin cover 7 so as to prevent water from entering the center hole 1c of the bobbin 1 by the O-ring 11. 12 is a U-shaped yoke as shown in FIG. 6 and has a hole 12b in a bottom portion 12a, and the pipe-shaped projected portion 3d of the stator core 3 is fitted in the above hole 12b. The U-shaped yoke 12 is arranged to hold the periphery of the resin cover 7 at both sides thereof, and the yoke 12 is fixed to the resin cover 7 and the bobbin 1 as a unit together with the stator core 3 by inserting protruding portions 12c provided at one end of the yoke 12 into holes 2c of the connecting plate 2b of the magnetic path plate 2 and by bending the protruding portions 12c inwardly. In this manner, the yoke 12 serves to magnetically couple the stator core 3 with the magnetic path plate 2, and also to play a role as a fixing member of the stator core 3. Furthermore, although it is not shown in the drawing, a bracket for mounting the solenoid valve is formed integrally with the yoke 12.

The operation of the solenoid valve having the above-mentioned construction will be explained as follows. When the coil 6 is not energized, the movable core 4 is pushed against the valve seat 1d by the spring force as shown in FIG. 1, and the entrance path 1a is closed by the valve plate 4c. Accordingly, the output path 1b is communicated with the passage 3b open to the atmosphere. Next, when the coil 6 is energized through the connector 10 and the lead-line 8 from the control circuit (not shown), magnetic flux is generated in a magnetic circuit consisting of the stator core 3, movable core 4, yoke 12 and magnetic path plate 2, and an attracting force is generated between the stator core 3 and the movable core 4. The movable core 4 is attracted to the stator core 3 overcoming the force of the spring 5, and thus the valve plate 4d closes the opening passage 3b to the atmosphere, and at the same time, the entrance path 1a is communicated with the output path 1b.

In the above-mentioned magnetic circuit, since the ring-shaped portion 2a of the magnet path plate 2 is directly insert-formed in the bobbin 1, it is possible to make very short the distance (magnetic gap) between the ring-shaped portion 2a of the magnetic path plate 2 and the movable core 4. Furthermore, since the ring-shaped portion 2a is disposed cylindrically surrounding the periphery of the movable core 4, it is possible to make sufficiently large the facing areas of the movable core 4 and the magnetic path plate 2 spreading cylindrically. As a result, a small sized and light weight solenoid valve can be achieved due to a decrease in reluctance and by reducing the number of the windings of the coil 6 by an amount corresponding to the decrease in reluctance.

Also, in this embodiment, by forming the hollow portion 4a axially in one end of the movable core 4 and by mounting the rubber-made valve plates 4c and 4d on both sides of the bottom plate 4b of the hollow portion 4a, it is possible to place the center of gravity of the movable core 4 very close to the positions of both valve plates 4c and 4d and to make the weight of the movable core 4 so light that the valve plates 4c and 4d exhibit a superior sealing effect when the solenoid valve is used at a position where vibration prevails as is the case in automobiles. Furthermore, by forming the external shape of the movable core 4 in a cylindrical shape, and on the other hand, by forming the inside surface of the sliding portion of the center hole 1c of the bobbin 1, which sliding portion being slidably in contact with the movable core 4, in a polygonal shape, it is possible to prevent inclination of the movable core 4 owing to the presence of the small diameter portion of the polygon as shown in FIG. 5, and it also enables to form a necessary fluid passage 1c' by utilizing a gap between the large diameter portion of the polygon and the movable core 4 as a fluid passage.

Furthermore, the prevention of water from entering into the coil portion of the solenoid valve can be ensured by the sealing effect of the O-ring 11 and also by the water-proof effect obtained by fitting the projected portion 7a in the ring-shaped groove 1e.

Figure 7:
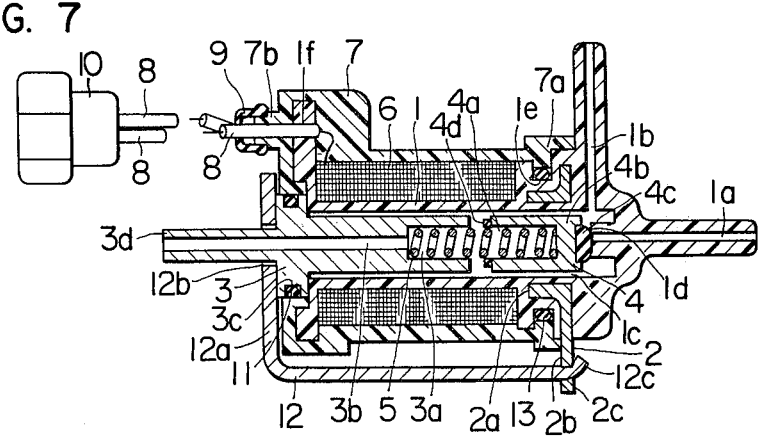
FIG. 7 is a sectional view of a solenoid valve of a second embodiment according to this invention.

FIG. 7 shows a second embodiment of this invention in which a hollow portion 4a in formed in the movable core 4 at one end facing the stator core 3 and one end of the spring 5 is held and guided by this hollow portion 4a. Furthermore, the water-proof effect is enchanced by fitting another O-ring in a ring-shaped groove 1e of the bobbin 1.

Figure 8:
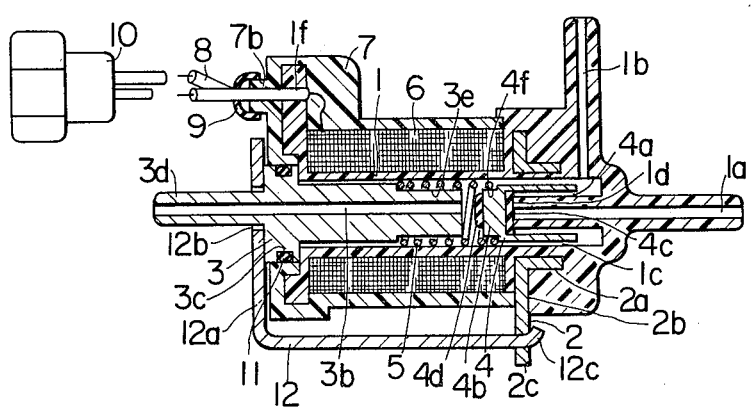
FIG. 8 is a sectional view of a solenoid valve of a third embodiment according to this invention.

FIG. 8 shows a third embodiment in which stepwisely reduced diameter portions 3e and 4f are formed respectively in the stator core 3 and the movable core 4. And the spring 5 is supported by these stepwisely reduced diameter portions 3e and 4f. In this embodiment, the position of the ring portion 2a of the magnetic path plate 2 with respect to the connecting plate 2b is reversed as contrasted with the first and second embodiments.

Figure 9:
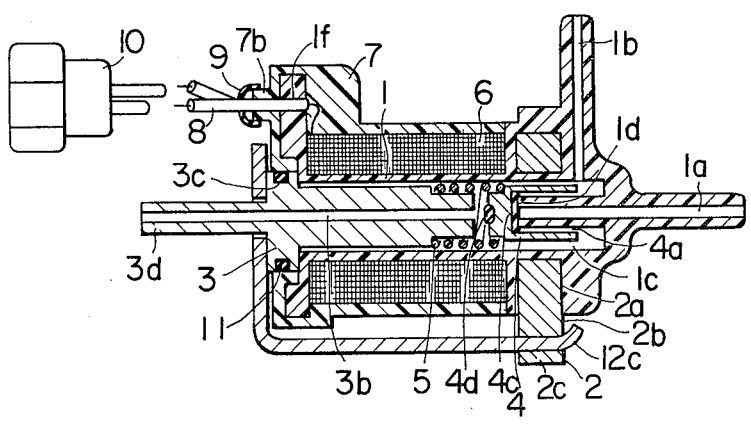
FIG. 9 is a sectional view of a fourth embodiment according to this invention.

FIG. 9 shows a fourth embodiment in which the magnetic path plate 2 is made thick and the ring portion 2a and the connecting plate 2b are formed in the same thickness.

Figure 10:
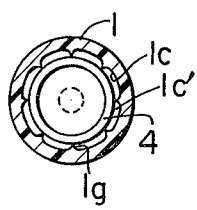
FIG. 10 is a sectional view of a part of a bobbin of a fifth embodiment according to this invention.

FIG. 10 shows a fifth embodiment of this invention in which a number of projections 1g are formed with equal intervals along a circumferential direction on the inner surface of the center hole 1c of the bobbin 1 without forming the center hole 1c in a polygonal shape. Gaps formed between these projections 1g and between the bobbin 1 and the movable core 4 are utilized as fluid passages.

Each the above-mentioned embodiments is described as to the case in which the three-way type valve having three passages 1a, 1b, and 3b is employed. However, it will be apparent that this invention can be applied also to the two-way type valve having only two passages.

Furthermore, this invention can be applied not only to solenoid valves for openning and closing the air passage but also to various kinds of solenoid valves for opening and closing a fluid passage. Further, as sealing materials, not only the O-rings 11 and 13 shown in the drawings but also a gasket may be used.

As described above, in this invention, by improving the construction of the magnetic path plate 2, reluctance can be reduced, and a solenoid valve of a small shape and light weight can be achieved.

We claim:

1. A solenoid valve for opening and closing a fluid passage formed therein comprising:
   a nonmagnetic bobbin having a body with a center hole and having fluid passage means,
   a coil wound around said bobbin,
   a stator core located in said center hole of said bobbin,
   a movable core movably positioned in said center hole of said bobbin for opening and closing said fluid passage means,
   spring means positioned between said stator core and said movable core for urging said movable core in a direction to separate said movable core from said stator core,
   magnetic path means having the greater part thereof insert-molded in the body of said bobbin and surrounding the outer surface of said movable core such that the inner surface of said magnetic path means and the outer surface of said movable core are in an opposed relationship with each other,
   said magnetic path means comprising a ring shaped portion and a flanged portion, said flanged portion being projected outwardly from the outer surface of said ring-shaped portion and having a part thereof further projected to the outside of said bobbin body,
   a cover formed to cover the periphery of said coil and fixed to said bobbin, and
   a yoke magnetically coupling said stator core and said magnetic path means.

2. A solenoid valve according to claim 1, wherein said magnetic path means is disposed such that the inner surface of said ring-shaped portion surrounds the outer surface of said moveable core and is concentric with the center hole of said bobbin.

3. A solenoid valve according to claim 1 wherein said ring-shaped portion projects from said flanged portion in a direction away from said stator core.

4. A solenoid valve according to claim 1 wherein said ring-shaped portion projects from said flanged portion in a direction toward said stator core.

5. A solenoid valve for opening and closing a fluid passage formed therein comprising:
   a bobbin made of resin and having a center hole and fluid passage means,
   a coil wound around said bobbin to produce a magnetic field within said center hole of said bobbin,
   a stator core stationarily located in one end portion of said center hole of said bobbin,
   a movable iron core cylindrically shaped and movably located in the other end portion of said center hole of said bobbin,
   spring means positioned between said stator core and said movable iron core for urging said movable iron core in a direction to separate said movable core from said stator core,
   a magnetic path member having a cylindrical inner surface and disposed surrounding said other end portion of said center hole of said bobbin coaxially with and opposite to said cylindrically shaped movable iron core to provide a magnetic path to and from said movable iron core, said magnetic path member being insert-molded in a body of said bobbin and having a part thereof extending radially to the outside of said bobbin body,
   a resin cover fixed to said bobbin and formed to cover the periphery of said coil, and
   a yoke having one end fixed to said stator core and the other end fixed to the extending part of said magnetic path member to provide magnetic coupling between said stator core and said magnetic path member,
   said fluid passage means being opened or closed depending on the movement of said movable iron core.

6. A solenoid valve according to claim 1 or 5 wherein a hollow portion is formed in one end of said moveable core to hold and guide one end of said spring means.

7. A solenoid valve according to claim 1 or 5 wherein stepwisely reduced diameter portions are formed in said stator core and in said moveable core to hold and guide one end of said spring means.

8. A solenoid valve according to claim 1 or 5 wherein projections are formed in a circumferential direction at equal intervals on the inner surface of said center hole of said bobbin.

9. A solenoid valve according to claim 1 or 5 including an O-ring disposed in a ring-shaped groove of said stator core for sealing between said stator core and said cover.

10. A solenoid valve according to claim 1 or 5 including an O-ring disposed in a ring-shaped groove of said bobbin for sealing between said bobbin and said cover.

11. A solenoid valve according to claim 1 or 5 wherein said fluid passage means includes a fluid path in the body of said bobbin coaxially with said center hole thereof, and wherein the valve seat is formed on an inside surface of the bobbin body in a portion where said fluid path is communicated with said center hole.

12. A solenoid valve according to claim 1 or 5 wherein said yoke is exposed outside of said cover.

13. A solenoid valve according to claim 1 wherein said part of said magnetic path means which is further projected to the outside of the body of said bobbin is provided with a through hole, and said yoke has a protruding portion which passes through said through hole and is thereafter bent over onto said magnetic path means for securing said yoke to said cover and said bobbin as a unit together with said stator core.

14. A solenoid valve according to claim 1 or 5 wherein a portion of said center hole of said bobbin is formed in a polygonal shape.

* * * * *